Patented July 15, 1924.

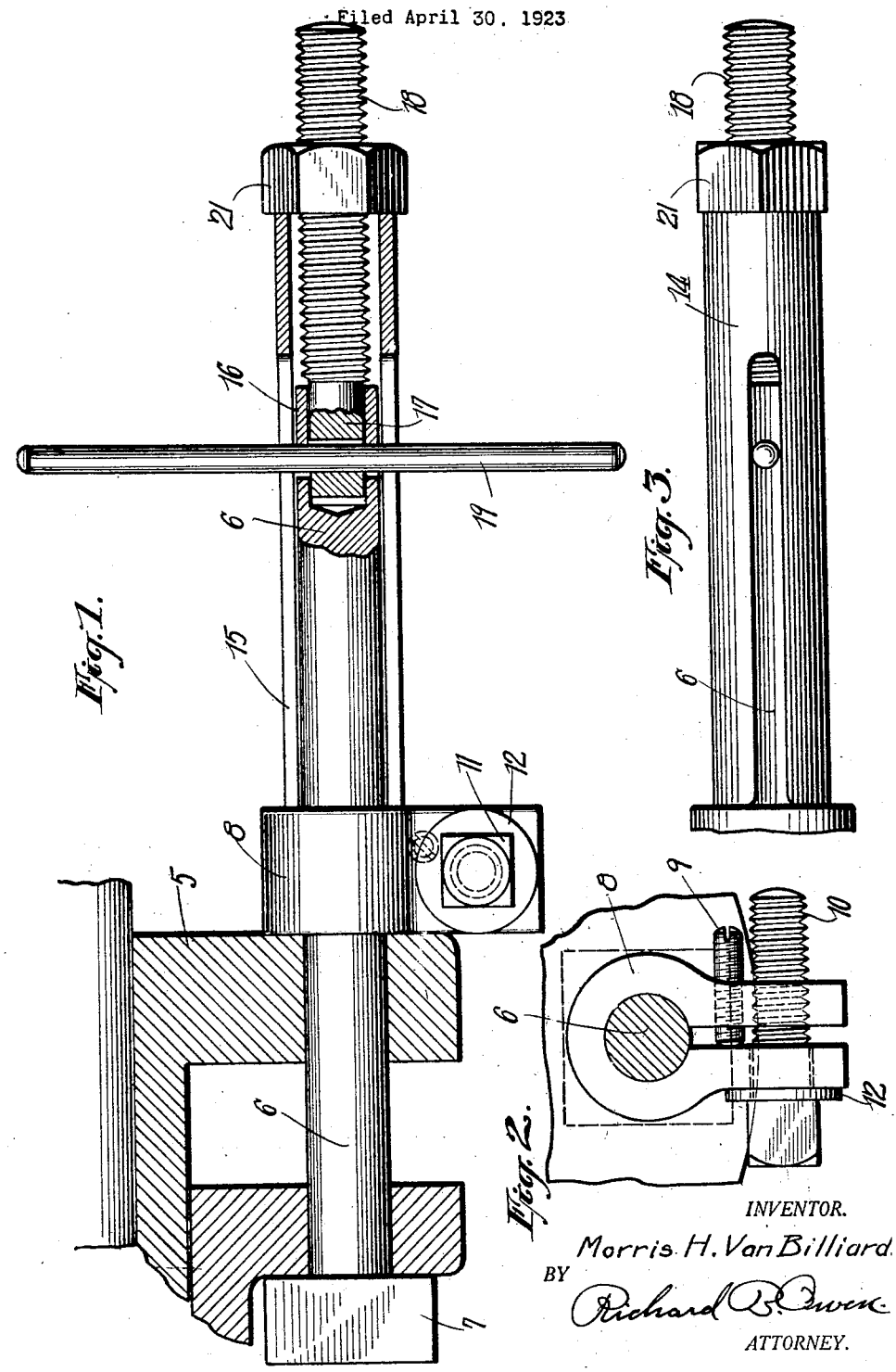

1,501,634

UNITED STATES PATENT OFFICE.

MORRIS H. VAN BILLIARD, OF BETHLEHEM, PENNSYLVANIA.

THREADLESS BOLT.

Application filed April 30, 1923. Serial No. 635,727.

*To all whom it may concern:*

Be it known that I, MORRIS H. VAN BILLIARD, a citizen of the United States, residing at Bethlehem, in the county of Northampton and State of Pennsylvania, have invented certain new and useful Improvements in Threadless Bolts, of which the following is a specification.

This invention relates to bolts for use in connection with a gland or stuffing box and is particularly applicable for steam hammers and the like wherein a quick and easily removable bolt is desired when replacing the piston rod of the hammer.

It is well known that due to excessive heat generated in power hammers that threaded bolts and nuts wear out or become strained with the result that the same are often burned or ground fast and in many instances the threads of the bolts are sprung from their regular threads with the result that the nut must be split in order to remove the bolts in instances where the piston must be replaced or repacked as when leaks occur in the steam hammers. The object therefore, of my invention is to overcome this difficulty in providing a threadless connecting bolt that is applicable for use in various constructions and machinery in general, and which affords a positive adjustable connection and easy assemblage of parts.

Another object of my invention is the provision of a threadless bolt including a clamp thereon and adjustable means for positioning the clamp with respect to the stuffing box, for instance, so that the latter can be held in position and the clamp tightened.

Another object of my invention is the provision of an adjustable threadless bolt of the character above specified which is extremely simple in construction, easily assembled, highly efficient, practical, durable, capable of universal use in different types of machinery and otherwise adapted to be manufactured at an extremely low cost whereby its commercial possibilities are greatly enhanced.

I accomplish the above objects and others which will be more readily understood when taken in connection with the accompanying drawings, showing a preferred embodiment of my invention and wherein, Figure 1 is a view partly in section showing the assembly of the bolt in connection with a gland or stuffing box.

Figure 2 is a detail of the clamp of the bolt in its relation to the gland or stuffing box.

Figure 3 is a side view showing the adjustable ferrule and the stud bolt cooperating therewith.

Referring now to the drawings, wherein like reference characters designate corresponding parts throughout the several views, 5 designates the gland or stuffing box which receives generally a threaded bolt, in this instance, however, a non-threaded bolt 6 being provided, and having a head 7 at one end. The bolt is of considerable length and has slidably mounted thereon a clamp 8, a set screw 9 extending through an aperture of one of the arms of the clamp and engaging the other arm is provided to separate the clamp for positioning on the bolt proper. A threaded lock bolt 10 having a head 11 and lock washer 12 extends through the arms of the clamps whereby the latter may be tightened when said clamp is moved into engaging relation with the gland of the stuffing box, for instance, as shown by Figure 1 of the drawing.

Slidably mounted on the bolt 6, I have provided a ferrule or sleeve 14, said ferrule having opposed slots 15 in the sides thereof for a purpose presently to appear. The bolt 6 is provided with a hollow end 16, which receives the non-threaded end 17 of a threaded stud bolt 18, it being observed that aligned apertures are provided in the end of the stud bolt and the bolt 16 for the passage of a steel coupling pin 19, which, of course, may slide in the slot 15 when adjusting the bolt. A nut 21 on the threaded stud bolt, engages the end of the ferrule 14 so as to slide the same toward the clamp 8 and move said clamp to its proper position with respect to the stuffing box. It will thus be seen from this construction that the bolt 6 may be easily removed from the gland or stuffing box by simply disconnecting the ferrule from the stud bolt which is held by the coupling pin 19 in which instance the clamp 8 may be removed from the end of the bolt 6 as clearly illustrated in the drawing.

While I have shown and described the adjustable feature of the bolt in connection with a gland or stuffing box and as applicable for use in connection with a steam or power hammer, it will be readily recognized and understood by those skilled in the art that the adjustable feature of the bolt is not necessarily limited to the above, but is of general application in various fields especially where a high degree of temperature may cause the connecting bolt to fuse and where its removal is difficult.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. A connecting bolt for glands, stuffing boxes and the like comprising a shank, a loose clamp on the shank, a slotted ferrule for adjusting the position of the clamp with respect to a part and means for locking the ferrule against the clamp.

2. A connecting bolt for glands, stuffing boxes and the like comprising a shank, a loose locking clamp on the shank, a slotted ferrule for adjusting the position of the clamp with respect to a part, a stud bolt and a pin extending through the slot in said ferrule and connecting said stud bolt with the shank.

3. A connecting bolt for glands, stuffing boxes and the like comprising a shank, a loose locking clamp on the shank, a slotted ferrule for adjusting the position of the clamp with respect to a part, a stud bolt extending into the ferrule, means extending through the slot in the ferrule for connecting the shank and stud bolt and a locking element on the stud bolt.

4. A connecting bolt for glands, stuffing boxes and the like comprising a shank, a loose locking clamp freely movable on the shank, a slotted ferrule for urging the clamp into abutting relation with a part, a threaded stud bolt extending into the end of the shank and into the ferrule, a connecting pin passing through the slot in the ferrule shank and stud bolt and a locking nut engaging the end of the ferrule.

In testimony whereof I affix my signature in presence of two witnesses.

MORRIS H. VAN BILLIARD. [L. S.]

Witnesses:
MAY THIEL,
W. H. STAHLNECKER.